United States Patent [19]

Sen

[11] Patent Number: 5,754,035

[45] Date of Patent: May 19, 1998

[54] APPARATUS AND METHOD FOR CONTROLLING FLOW OF POWER IN A TRANSMISSION LINE INCLUDING STABLE REVERSAL OF POWER FLOW

[75] Inventor: Kalyan Kumar Sen, Monroeville, Pa.

[73] Assignee: Westinghouse Electric Corporation, Pittsburgh, Pa.

[21] Appl. No.: 783,470

[22] Filed: Jan. 14, 1997

[51] Int. Cl.$^6$ ..................................................... G05F 1/70
[52] U.S. Cl. ............................................................ 323/207
[58] Field of Search .................................. 323/205, 207, 323/210; 333/17.3

[56] References Cited

U.S. PATENT DOCUMENTS

| 4,356,441 | 10/1982 | Putman et al. | 323/210 |
| 4,555,659 | 11/1985 | Gyugyi | 323/210 |
| 5,166,597 | 11/1992 | Larsen et al. | 323/215 |
| 5,198,746 | 3/1993 | Gyugyi et al. | 323/207 |
| 5,309,346 | 5/1994 | Gyugyi | 363/54 |
| 5,329,221 | 7/1994 | Schauder | 323/207 |
| 5,329,222 | 7/1994 | Gyugyi et al. | 323/207 |
| 5,343,139 | 8/1994 | Gyugyi et al. | 323/207 |
| 5,420,495 | 5/1995 | Hingorani | 323/218 |
| 5,469,044 | 11/1995 | Gyugyi et al. | 323/207 |
| 5,610,501 | 3/1997 | Nelson et al. | 323/207 |
| 5,646,511 | 7/1997 | Akamatsu et al. | 323/207 |

OTHER PUBLICATIONS

"Series Compensator Inserting Real and Reactive Impedance Into Electrical Power System For Damping Power Oscillations," Serial No. 08/366,646, Filed: Dec. 30, 1994, Gyugyi et al., Docket No. 58,319.

"Apparatus and Method for Interline Power Flow Control," Serial No. 08/564,535, Filed: Nov. 29, 1994, Gyugyi, Docket No. 58686.

Primary Examiner—Stuart N. Hecker

[57] ABSTRACT

Power flow in a transmission line carrying alternating current is controlled by injecting into the transmission line in series a compensating voltage which is either in phase or 180° out of phase with a reactive component of the transmission line voltage. The compensating voltage is generated by a voltage source converter operated by a controller which determines the angle of the transmission line voltage from voltage measurements taken at spaced apart points on the transmission line. Operation of the inverter in this voltage control mode results in an increase in power flow when the compensating voltage is injected at 180° out of phase with the voltage across the transmission line effective reactance. When the compensating voltage is injected in phase with the voltage across the transmission line effective reactance, the power flow decreases at first from the uncompensated value and can be reduced to zero when the compensating voltage equals the voltage across the transmission line effective reactance without compensation. Further increase in the compensating voltage in the same direction reverses the direction of power flow.

8 Claims, 5 Drawing Sheets

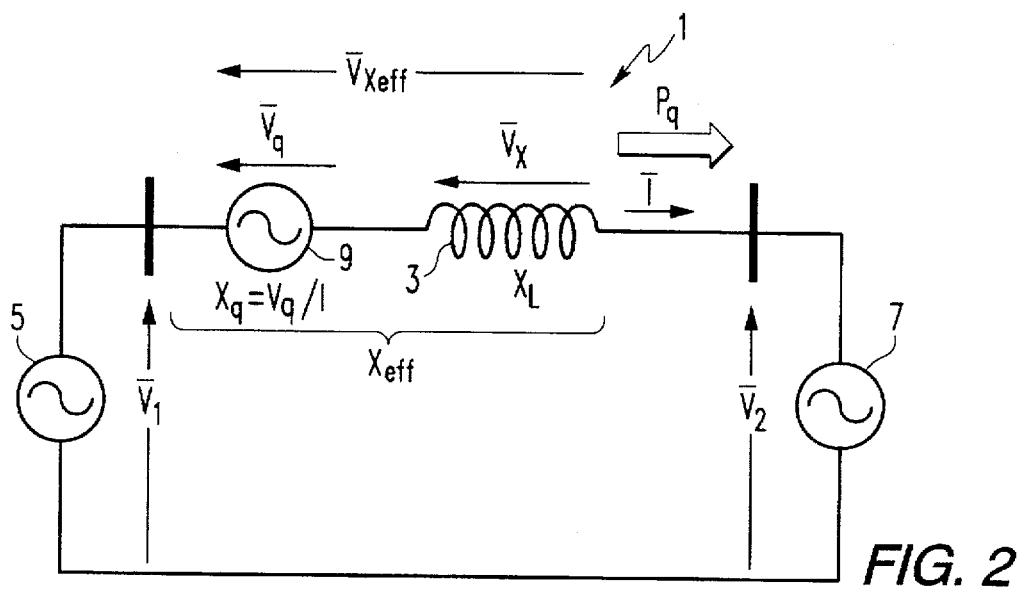
*FIG. 2*
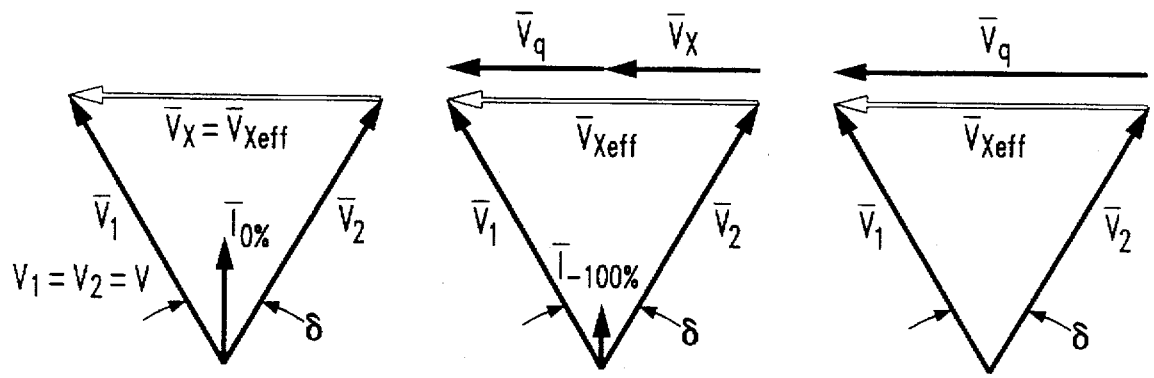
*FIG. 3a*   *FIG. 3b*   *FIG. 3c*
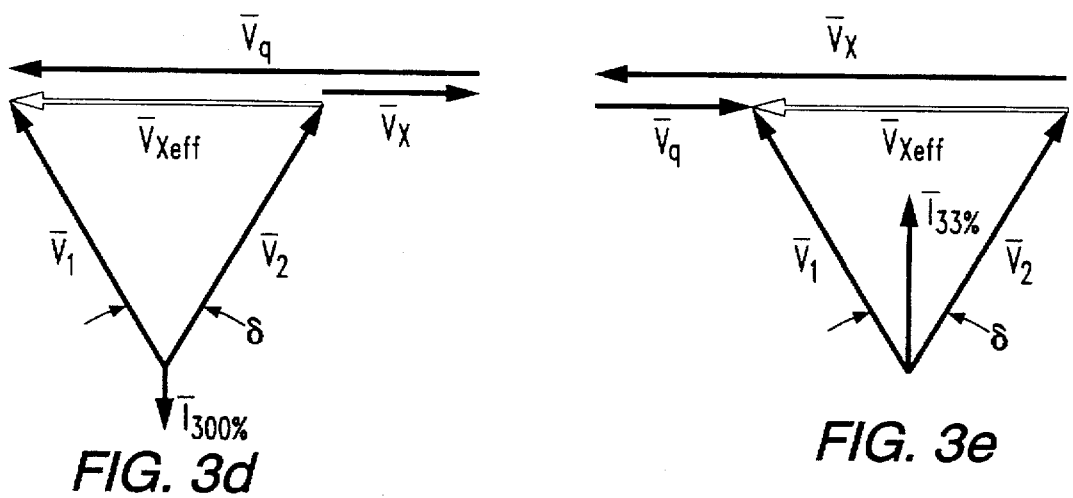
*FIG. 3d*   *FIG. 3e*

5,754,035

APPARATUS AND METHOD FOR CONTROLLING FLOW OF POWER IN A TRANSMISSION LINE INCLUDING STABLE REVERSAL OF POWER FLOW

BACKGROUND OF THE INVENTION

1. Field of the Invention

This invention relates to control of power flow in a transmission line and, in particular, to controlling power flow to achieve a stable reversal of power flow using a static converter operated in a voltage control mode to inject a compensating voltage into the transmission line which is either in-phase or 180° out-of-phase with the transmission line reactive voltage.

2. Background Information

Electric power flow through an alternating current transmission line is a function of the line impedance, the magnitudes of the sending end and receiving end voltages, and the phase angle between these voltages. The impedance of the transmission line is inductive. The power flow can be decreased by inserting an additional inductive reactance in series with the transmission line, thereby increasing the effective reactance of the transmission line between its two ends. On the other hand, the power flow can be increased by inserting an additional capacitive reactance in series with the transmission line, thereby decreasing the effective reactance of the transmission line between its two ends. If the compensating capacitive reactance is more than the transmission line inductive reactance, the effective reactance of the transmission line between its two ends becomes capacitive and the power flow in the transmission line can be reversed from the original direction of flow.

Traditionally, in order to control the power flow of the transmission line, the effective line reactance is controlled by using fixed or thyristor controlled series capacitors and inductors. Recently, a new power flow controller which uses solid state switching converters has been proposed. Such a power flow controller is described in U.S. Pat. No. 5,198,746 entitled "Transmission Line Dynamic Impedance Compensation System." With the use of the impedance compensation controller, a static synchronous series compensator (SSSC), which is a solid-state voltage source inverter, injects an almost sinusoidal voltage, of variable magnitude, in series with the transmission line. This injected voltage is almost in quadrature with the line current. A small part of the injected voltage, which is in phase with the line current provides the losses in the inverter. Most of the injected voltage which is in quadrature with the line current emulates a capacitive or an inductive reactance in series with the transmission line. This emulated variable reactance, inserted by the injected voltage source, influences the electric power flow in the transmission line.

The impedance compensation controller can compensate for the transmission line resistance if operated with an energy storage system. The impedance compensation controller, when used with an SSSC and no energy storage system, is essentially a reactance compensation controller. The reactance compensation control method is used to operate the inverter so that the injected alternating voltage in series with the transmission line is proportional to the line current with the emulated reactance being the constant of proportionality. Therefore, for an SSSC to operate using the reactance compensation control method, the presence of line current is required. This prevents the controller from emulating a highly inductive reactance in series with the transmission line as the current would be very small. When the SSSC injects an alternating voltage leading the line current, thereby emulating an inductive reactance in series with the transmission line, the power flow, as well as the line current, decrease as the level of compensation increases. When the SSSC injects an alternating voltage lagging the line current thereby emulating a capacitive reactance in series with the transmission line, the power flow, as well as the line current, increase as the level of compensation increases. The undesirable feature of the reactance compensation control method appears during a reversal of power flow in the transmission line. In order to reverse the power flow in a transmission line, the controller has to operate in a capacitive reactance control mode. At the instant of power flow reversal, the inductive reactance of the transmission line and the capacitive reactance emulated by the SSSC become equal, resulting in instability in the power flow of the transmission line. Furthermore, the capacitive reactance compensation can only be increased up to a point that is permissible by the rating of the SSSC. Beyond that, the SSSC will operate in a bypass mode as soon as it reaches the rated operating conditions. Therefore, none of the above power flow controllers, either active or passive, are intended for use in reversing power flow in transmission lines.

There is a need therefore for improved apparatus and a method for controlling power flow in an ac transmission line which provides for a stable reversal of the direction of power flow.

SUMMARY OF THE INVENTION

This need and others are satisfied by the invention which implements voltage control of a static synchronous series compensator (SSSC) to control the flow of power on a transmission line. In the voltage control mode, a controller operates the SSSC to inject a compensating voltage, in series with the transmission line. This compensation voltage is either in phase with or 180° out of phase with the voltage across the effective reactance of the transmission line. When the compensating voltage is injected 180° out of phase with the voltage across the effective reactance (the reactive component of the transmission line voltage) it provides capacitive reactance compensation which increases power flow in the direction in which it flows without compensation. When the compensating voltage is injected into the transmission line in phase with the reactive component of the transmission line voltage, it initially provides inductive reactance compensation which reduces power flow. When the compensation voltage becomes equal to the voltage across the effective transmission line reactance, the current, and therefore, the power flow is reduced to zero. A further increase in the compensation voltage injected in phase with the reactive component of the transmission line voltage results in a reversal of power flow. Thus, it can be seen that in accordance with the invention a stable reversal of power flow is achieved. The solid state inverter is operated in the voltage control mode by a controller which measures voltages at two spaced apart points on the transmission line and calculates a transmission line voltage as the difference between those two voltages. As the transmission line has resistance as well as inductance, the controller also utilizes a measurement of transmission line current and a measure of transmission line resistance between the two points, together with the calculated transmission line voltage to find the reactive component of the voltage between the two points on the transmission line or the voltage across the effective reactance of the transmission line.

The invention embraces both the apparatus and method for operating an inverter such as an SSSC in the voltage control mode to control power flow in an ac transmission line including a stable reversal of power flow.

BRIEF DESCRIPTION OF THE DRAWINGS

A full understanding of the invention can be gained from the following description of the preferred embodiments when read in conjunction with the accompanying drawings in which:

FIG. 2 is a single line diagram similar to FIG. 1 but illustrating an elementary transmission line system with series compensation provided by an SSSC operating in a voltage control mode.

FIG. 3A is a phasor diagram illustrating operation of the system of FIG. 2 with zero compensation.

FIG. 3B is a phasor diagram illustrating operation of the system of FIG. 2 with 100% inductive compensation when the injected voltage is in phase with the reactive component of the transmission line voltage.

FIG. 3C is a phasor diagram illustrating operation of the system of FIG. 2 with infinite compensation when the voltage is injected in phase with the reactive component of the transmission line voltage.

FIG. 3D is a phasor diagram illustrating operation of the system of FIG. 2 with 300% capacitive compensation when the injected voltage is in phase with the reactive component of the transmission line voltage.

FIG. 3E is a phasor diagram illustrating operation of the system of FIG. 2 with 33% capacitive compensation when the voltage is injected 180° out of phase with the reactive component of the transmission line voltage.

DESCRIPTION OF THE PREFERRED EMBODIMENT

Figure 1:
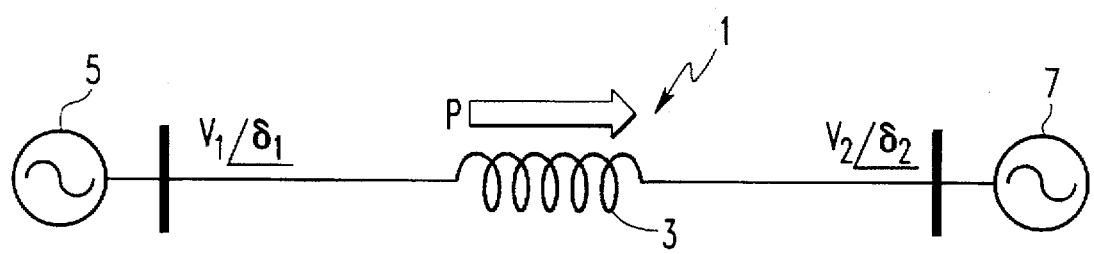
FIG. 1 is a single line diagram of an elementary power transmission system.

FIG. 1 shows a single line diagram of a simple transmission line 1 with an inductive reactance, $X_L$ represented by the inductor 3 connecting two voltage sources 5 and 7. The power flow P from the first voltage source 5 to the second voltage source 7 is given by the expression $$P = \frac{V_1 V_2}{X_L} \sin(\delta_1 - \delta_2) = \frac{V^2}{X_L} \sin\delta \qquad \text{(Eq. 1)}$$

where $V_1$ and $V_2$ are the magnitudes and $\delta_1$ and $\delta_2$ are the phase angles of the first and second voltage sources 5 and 7, respectively. For simplicity, the voltage magnitudes and phase angles are chosen, such that $V = V_1 = V_2$ and $\delta = \delta_1 - \delta_2$.

The prior art reactance control method of power flow control in a transmission line calls for emulating reactance compensation in the power line to control the effective value of the reactance. By emulating inductive reactance compensation, the power flow is decreased. By emulating capacitive reactance compensation the power flow is increased. If the capacitive reactance compensation exceeds the inductive reactance of the transmission line, the flow of power can be reversed. However, while changing direction, the power flow goes through two simultaneous extremes; one is a very high positive value when the transmission line effective reactance is nearly zero inductive, and the second is a very high negative value when the effective reactance is nearly zero capacitive. The result of an attempt to reverse power flow in the transmission line by reactance control is a resonance which would produce currents which would exceed the thermal limits of the transmission line.

In accordance with the present invention, the flow of power is controlled by operating an SSSC in a voltage control mode. A one line diagram illustrating such control is shown in FIG. 2. Instead of emulating a compensating reactance in series with the transmission line inductive reactance, $X_L$, a compensating voltage, $V_q$, is injected in series with the transmission line 1 as indicated by the compensating voltage source 9. This compensating voltage can be injected either in phase or 180° out of phase with the voltage $V_x$ across the transmission line inductive reactance $X_L$ without compensation. The vector sum of the voltage $V_x$ across the transmission line inductive reactance $X_L$ and the compensating voltage $V_q$ equals $V_{Xeff}$, the voltage across the effective transmission line reactance $X_{eff}$ which equals $X_L$ minus $X_q$, with the latter being the reactance emulated by the compensating voltage. This voltage $V_{Xeff}$ is set by the difference between the source voltages $V_1$ and $V_2$ and, therefore, remains constant. Hence, by adjusting the compensating voltage $V_q$, the voltage $V_x$ can be controlled.

FIG. 3a is a phasor diagram illustrating the currents and voltages in the transmission line in FIG. 2 with no compensation. FIG. 3b illustrates emulation of 100% inductive compensation when the injected voltage is in phase with the voltage across the transmission line reactance. By 100% inductive compensation it is meant that the injected voltage is such that the value of the emulated inductive reactance equals the transmission line inductive reactance without compensation. As can be seen, this reduces the current $\bar{I}$ in the transmission line. With infinite compensation, as shown in FIG. 3c, the injected voltage $V_q$ is equal to the voltage $V_x$ across the inductive reactance without compensation and the current is reduced to zero. If the compensating voltage further increases, as shown in FIG. 3d, and exceeds the value of the voltage $V_x$ without compensation, the voltage $V_x$ as well as the current $\bar{I}$ reverse. Thus, as the compensating voltage which is in phase with the voltage across the transmission line reactance without compensation increases the current is reduced to zero and then reverses direction smoothly and without resonance. As shown in FIG. 3e, injection of a compensating voltage $V_q$ 180° out of phase with the voltage $V_x$ results in an increase in $V_x$ and, therefore, an increase in the current $\bar{I}$. Thus, voltage control can be used to increase power flow, decrease power flow, or even reverse power flow. The expression for power flow in the transmission line 1 can be written in terms of voltage compensation as $$P_q = V \frac{V_{Xeff} + V_q}{X_L} \cos(\delta/2) \qquad \text{(Eq. 2)}$$

Since, $V_{Xeff} = 2V \sin(\delta/2)$, the above equation can be rewritten as $$P_q = \frac{V^2}{X_L}\left(1 + \frac{V_q}{V_{Xeff}}\right)\sin\delta \qquad \text{(Eq. 3)}$$

From equations (1) and (3), the expression for the normalized power flow in the transmission line can be written as $$\frac{P_q}{P} = 1 + V_q/V_{Xeff} \qquad \text{(Eq. 4)}$$

This power expression has a zero value at $V_q/V_{Xeff}=-1$ causing an absolute stability at the instant when power flow, $P_q$, reverses as shown in FIG. 3c.

Figure 4:
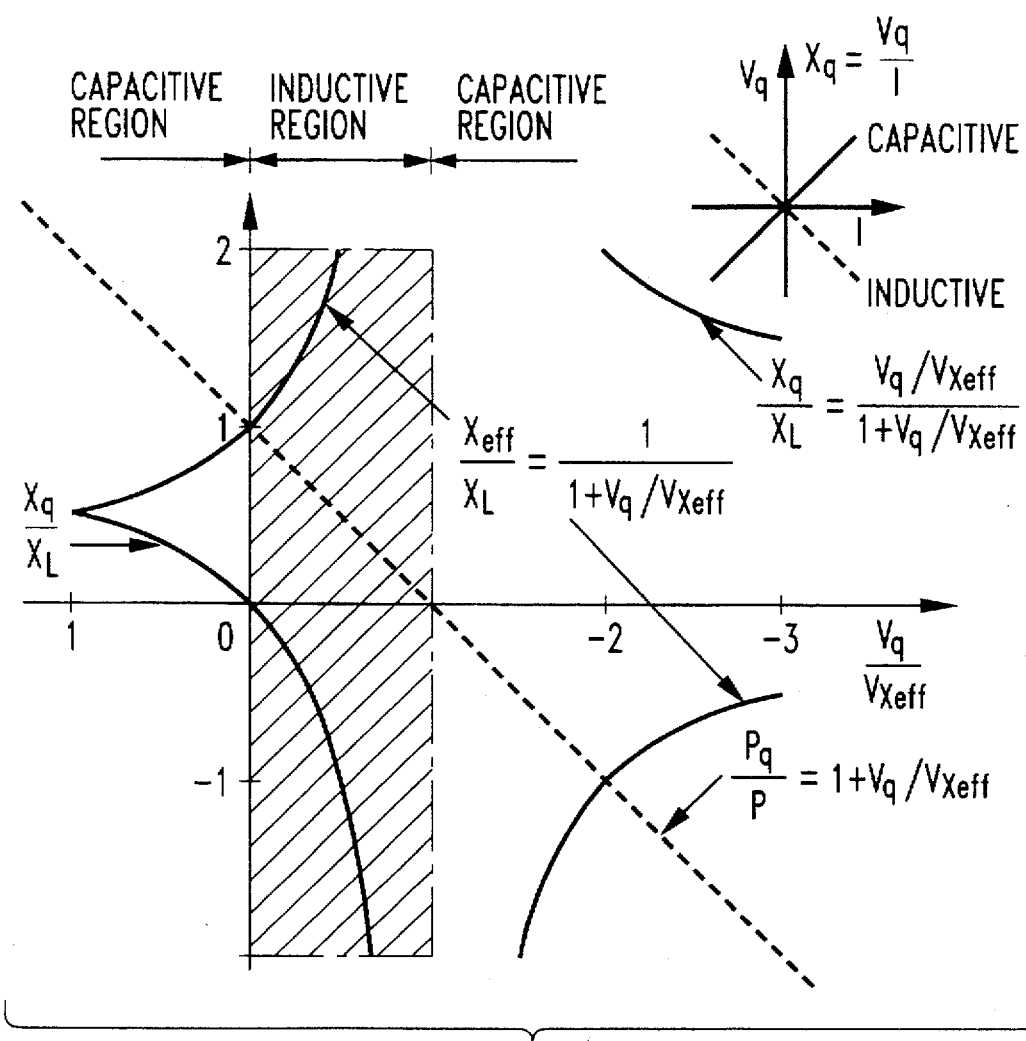
FIG. 4 is a diagram which illustrates the effect of injection of a compensating voltage in accordance with the invention on power flow and effective and compensating reactances.

The effects of the compensation voltage $V_q$, (for being both in phase and at 180° out of phase with the voltage, $V_{Xeff}$, across the transmission line effective reactance, $X_{eff}$) on the normalized power flow, $P_q/P$, in the transmission line, the normalized effective reactance, $X_{eff}/X_L$, and the normalized compensating reactance, $X_q/X_L$, of the transmission line are shown in FIG. 4. When the compensating voltage is injected in phase with the voltage across the transmission line effective reactance, the effective line reactance increases monotonically as the voltage compensation, $-V_q/V_{Xeff}$, increases during $0 > V_q/V_{Xeff} > -1$. When fully compensated, i.e., at $V_q/V_{Xeff}=-1$, the effective line reactance reaches infinity. Finally, the effective line reactance decrease monotonically in the reverse direction as the voltage compensation, $-V_q/V_{Xeff}$ increases during $V_q/V_{Xeff}<-1$. When the compensating voltage is injected at 180° out of phase with the voltage across the transmission line effective reactance, the effective line reactance monotonically decreases as the voltage compensation, $V_q/V_{Xeff}$ increases during $V_q/V_{Xeff}>0$. The points to be made here are:

(1) An SSSC is capable of controlling the power flow in a transmission line when operating in a voltage control mode.

(2) When the compensating voltage is injected in phase with the voltage across the transmission line effective reactance, this power flow can be reversed.

However, while changing direction, this power flow $P_q$, goes through zero, resulting in absolute stability in the power flow, $P_q$, of the transmission line. During the transition period when the power flow, $P_q$, reverses, the effective reactance, $X_{eff}$ goes through two simultaneous extremes: one is a very high inductive value when the power flow, $P_q$, in the transmission line is nearly zero positive and the next one is a very high capacitive value when the power flow, $P_q$, is nearly zero negative. The fact is that in the region where $0>V_q/V_{Xeff}>-1$, the SSSC acts like a reactance compensator operating in an inductive reactance control mode. In the rest of the region, the SSSC acts like a reactance compensator operating in a capacitive reactance control mode.

Figure 5:
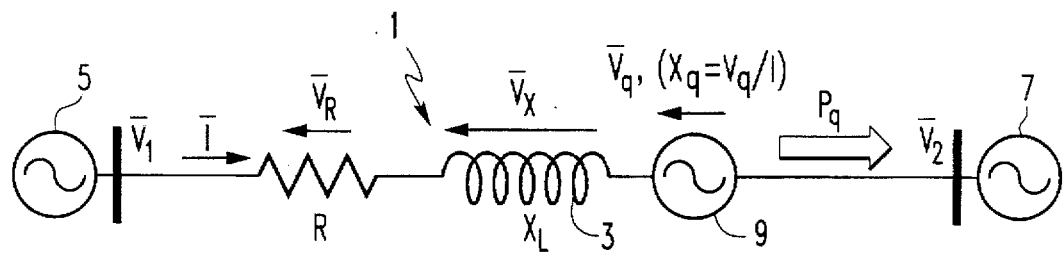
FIG. 5 is a single line diagram of an elementary transmission line system provided with series voltage control compensation and taking into account resistance in the transmission line.
Figure 6:
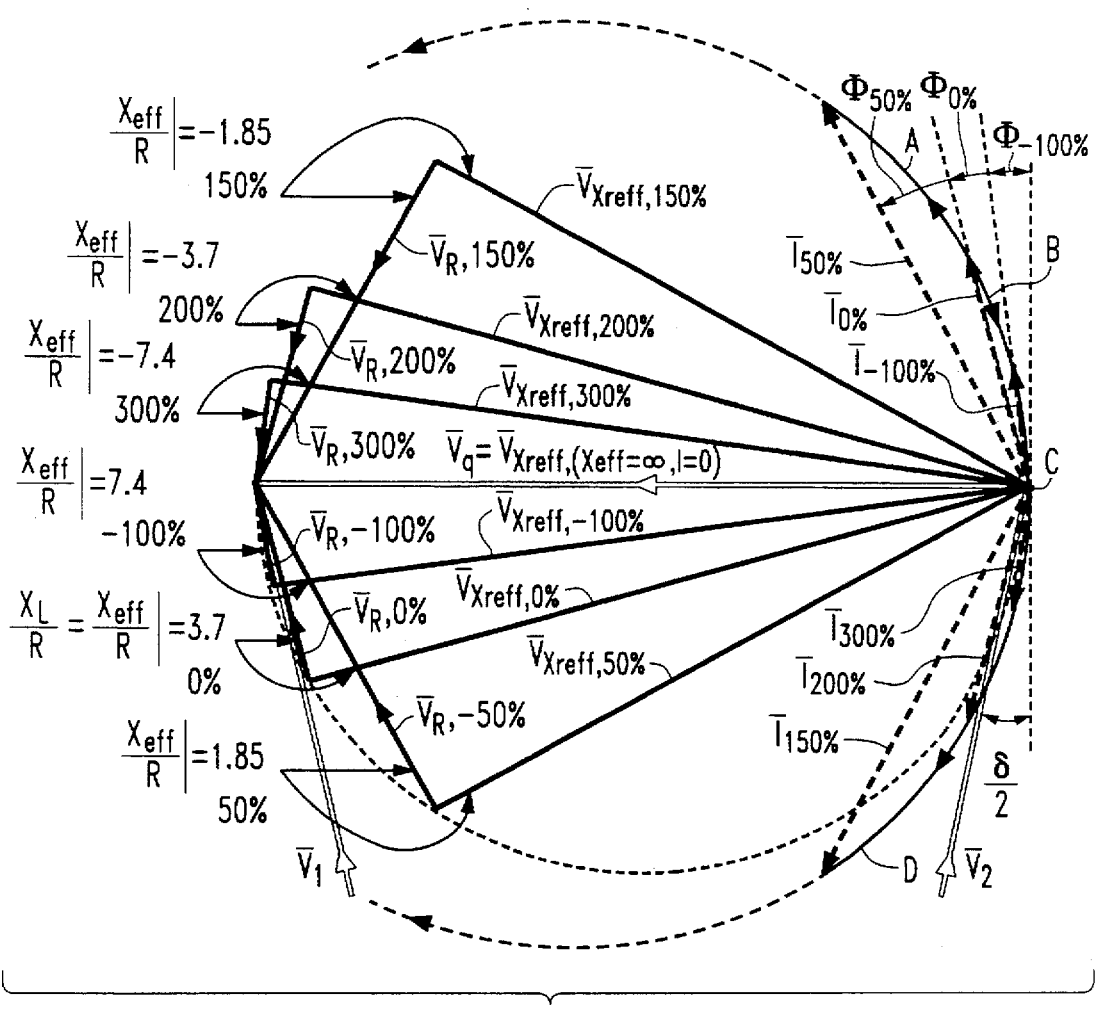
FIG. 6 is a phasor diagram illustrating voltage control operation of the system of FIG. 5 for various levels of compensation in phase and 180° out of phase with the voltage across the effective reactance of the transmission line.

FIG. 5 shows a single line diagram of a power transmission system with an SSSC operating in the voltage control mode and taking into account transmission line resistance 11. The related phasor diagrams are shown in FIG. 6. Consider the example of a transmission line with an $X_L/R$ ratio of 3.7 and no voltage compensation of any kind, i.e., $V_q=0$, delivering power from the first voltage source 5 to the second voltage source 7 through the transmission line 1. In order to increase the power flow, $P_q$, through the transmission line, an SSSC must be operated in a voltage control mode with the compensating voltage, $V_q$, injected at 180° out of phase with the voltage, $V_{Xeff}$ across the transmission line effective reactance, $X_{eff}$. The resulting line current, $\bar{I}_{50\%}$, with 50% capacitive reactance compensation is in quadrature leading the injected voltage. The trajectory of line current $\bar{I}_{0\%}$ with no compensation to $\bar{I}_{50\%}$ with an equivalent of 50% capacitive reactance compensation, $X_q/X_L$, is shown in FIG. 6 at A. Further increase in the voltage compensation, $V_q/V_{Xeff}$ in the same direction, only increases the power flow, $P_q$, in the transmission line. To decrease the power flow, $P_q$, the SSSC operating in the voltage control mode injects compensating voltage, $V_q$, in phase with the voltage, $V_{Xeff}$ across the transmission line effective reactance, $X_{eff}$. The resulting line current, $\bar{I}_{100\%}$, with 100% inductive reactance compensation is in quadrature lagging the injected voltage. The trajectory of line current from $\bar{I}_{0\%}$ with no compensation to $\bar{I}_{100\%}$ with an equivalent of 100% inductive reactance compensation, $-X_q/X_L$, is also shown in FIG. 6 at B. When the injected voltage $V_q$, equals the voltage, $V_{Xeff}$, across the transmission line effective reactance, $X_{eff}$, the line current I, as well as the power flow, ceases as shown at C. At this point, the injected voltage source simulates an infinite inductive reactance in series with the transmission line. Further increase in the compensating voltage injected in the same direction causes the line current and the power flow to increase in the reverse direction. At this point, the compensating injected voltage source changes its role from being a very large inductive reactance to a very large capacitive reactance. The trajectory of reverse line current during the reverse power flow is also shown in this FIG. 5 at D. Therefore, an SSSC operated with voltage control, as described, always maintains the line current within safe limits as shown by the solid trajectory, A-D, regardless of the direction of power flow, $P_q$.

Figure 7:
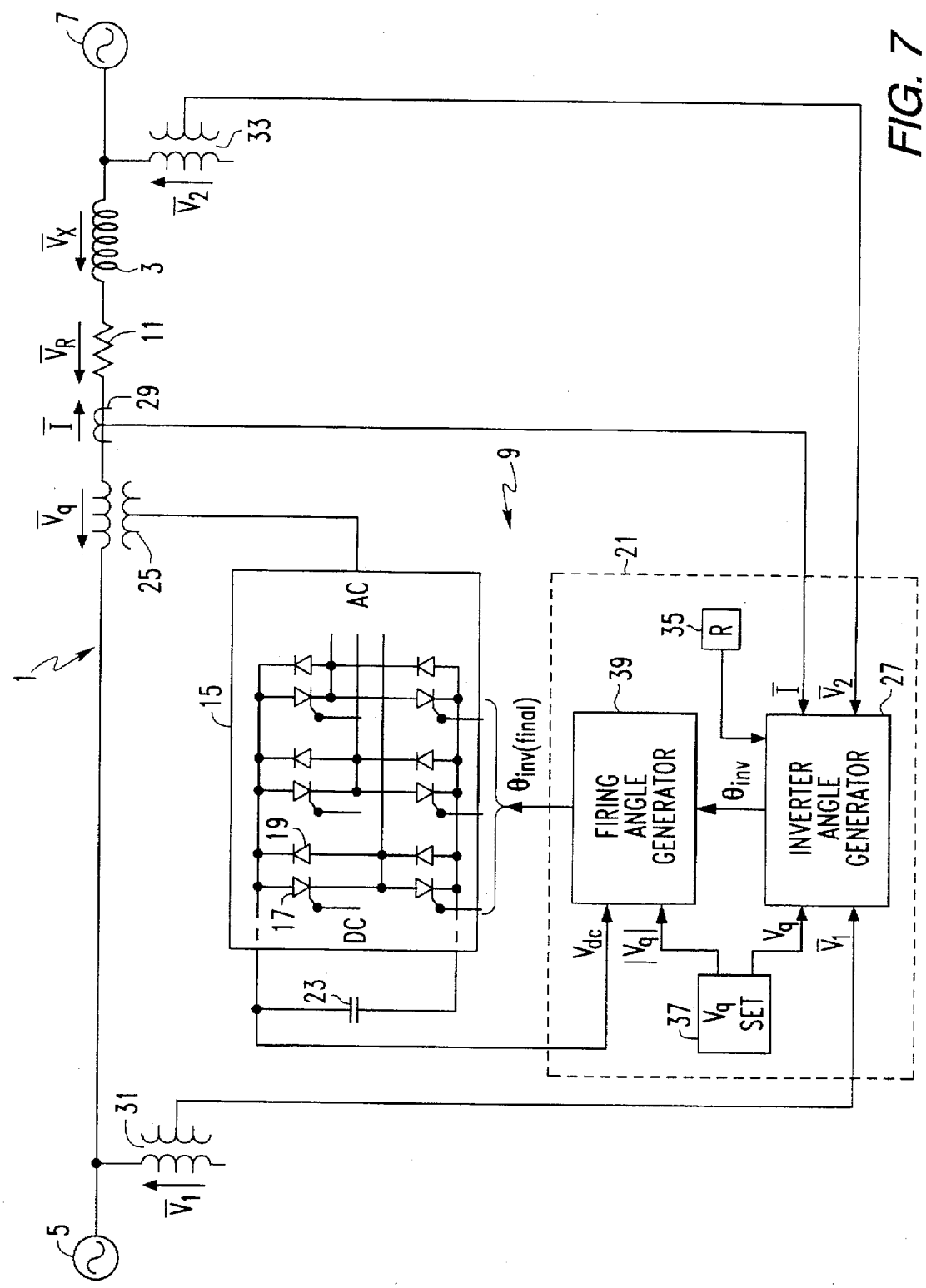
FIG. 7 is a schematic diagram mostly in block form of a transmission line system incorporating an SSSC operated in a voltage control mode in accordance with the invention.

The FIG. 7 illustrates an arrangement for implementing voltage control of an SSSC to control power flow in the transmission line 1. Compensation voltage source 9 includes the SSSC 15 employing self-commutated semi-conductor switches, such as Gate-Turn-Off (GTO) thyristors 17 shunted by reverse-parallel connected diodes 19. While a simple 6 pulse converter circuit is shown in FIG. 7, in practice a higher pulse converter such as the 48 pulse converter shown in U.S. Pat. No. 5,343,139 would be employed. The firing angles of the GTOs are controlled by a controller 21 to generate from a DC voltage $V_{dc}$, across the capacitor 23, a three phase compensation voltage which is serially injected into the transmission line 1 through the transformer 25. As will be discussed, the controller 21 adjusts the firing angles of the GTOs 17 to set the required magnitude of the injected voltage. The controller 21 includes an inverter angle generator 27 which generates the inverter angle $\theta_{inv}$ which determines the phase angle between the compensation voltage $V_q$ and the voltage $V_{Xeff}$ across the effective reactance in the transmission line. In order to generate $\theta_{inv}$, the inverter angle generator 27, uses the current $\bar{I}$ in the transmission line as detected by the current transformer 29. The inverter angle generator 27 also utilizes as an input the effective voltage across the transmission line 1 or a part of the transmission line. Thus, voltage measurements are taken at two spaced apart points on the transmission line by the potential transformers (PTs) 31 and 33. Additional inputs to the inverter angle generator 27 are the resistance R of the transmission line between the PTs 31 and 33, as provided through the input device 35, and the desired voltage compensation $V_q$ as provided by the input 37.

The controller 21 also includes a firing angle generator 39 which adjusts the inverter angle $\theta_{inv}$ to produce the final individual firing signals $\theta_{inv\ (final)}$ in response to the input of the magnitude of the compensation voltage $V_q$ desired. The firing angle generator 39 also receives as feedback the voltage $V_{dc}$ across the capacitor 23 in order to adjust the firing of the GTOs 17 to set the amplitude of the injected three phase voltage $V_q$.

Figure 8:
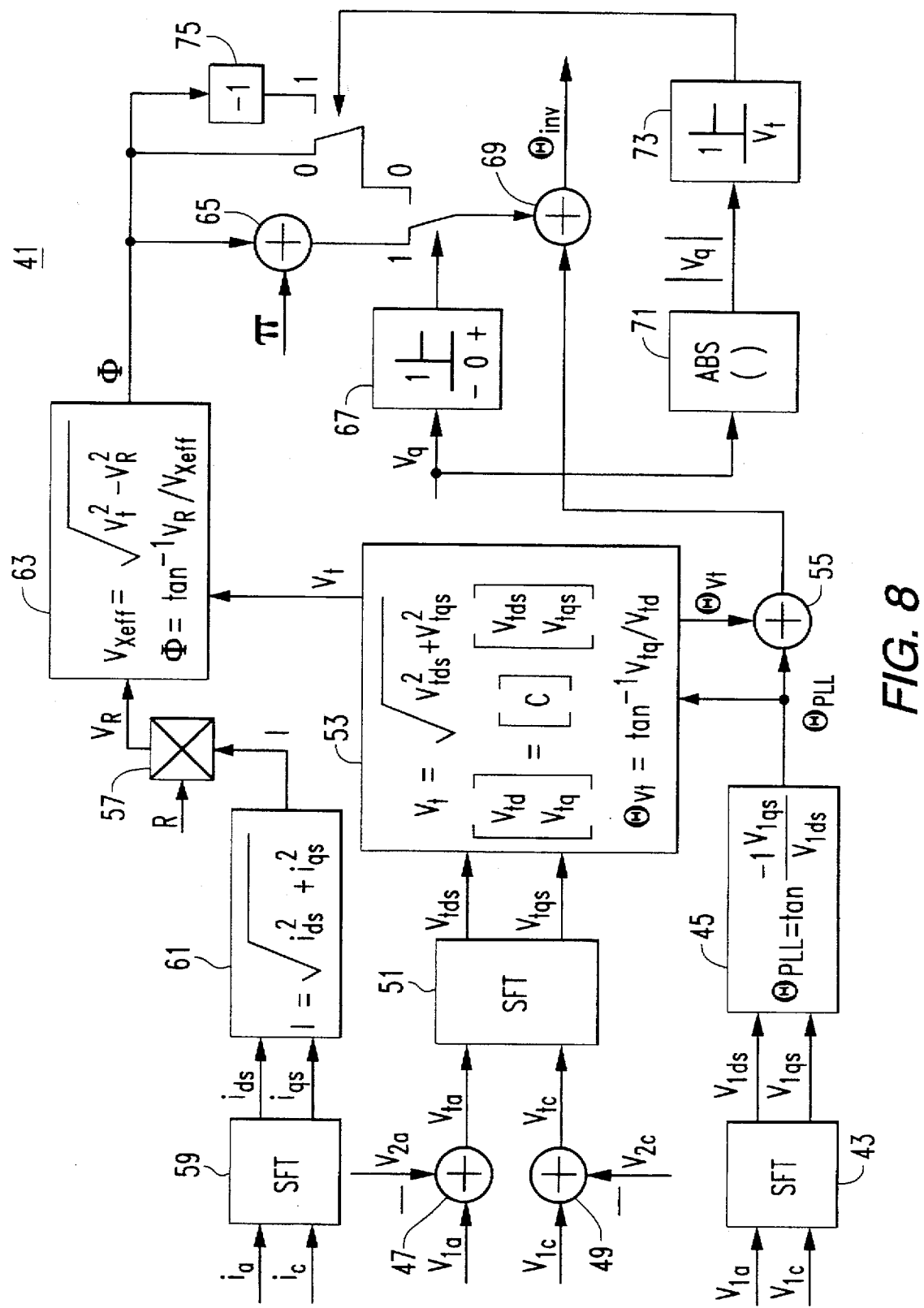
FIG. 8 is a diagram of the voltage control scheme of operation implemented by the system of FIG. 7.
Figure 5:
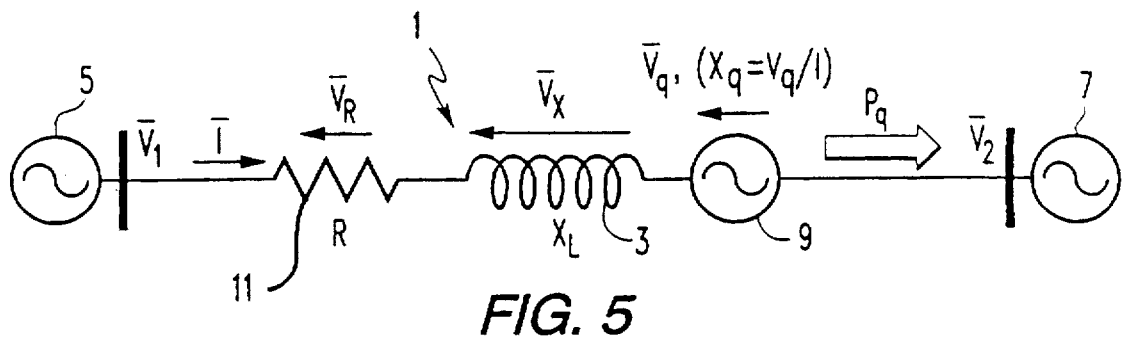
Figure 6:
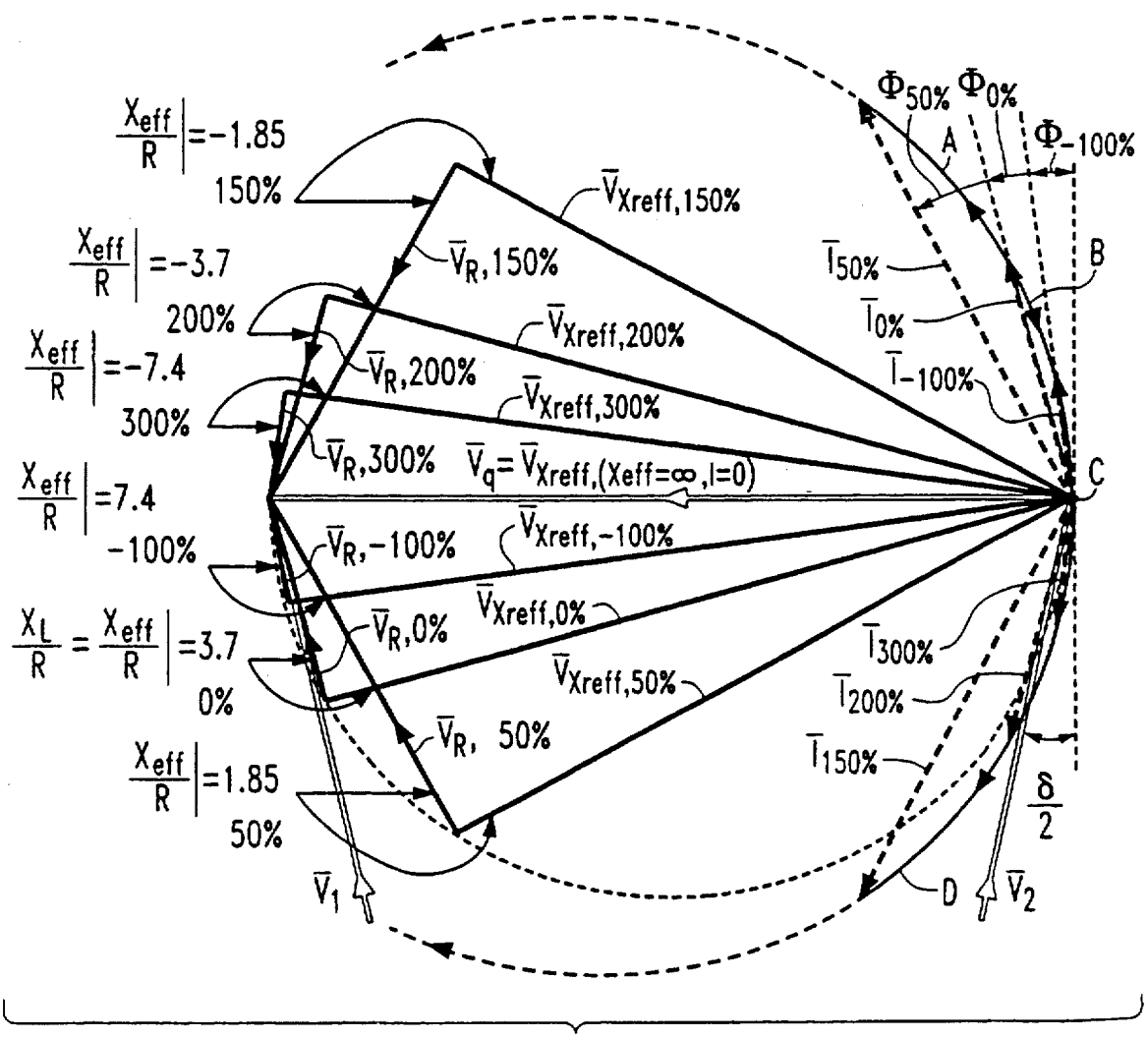
Figure 8:
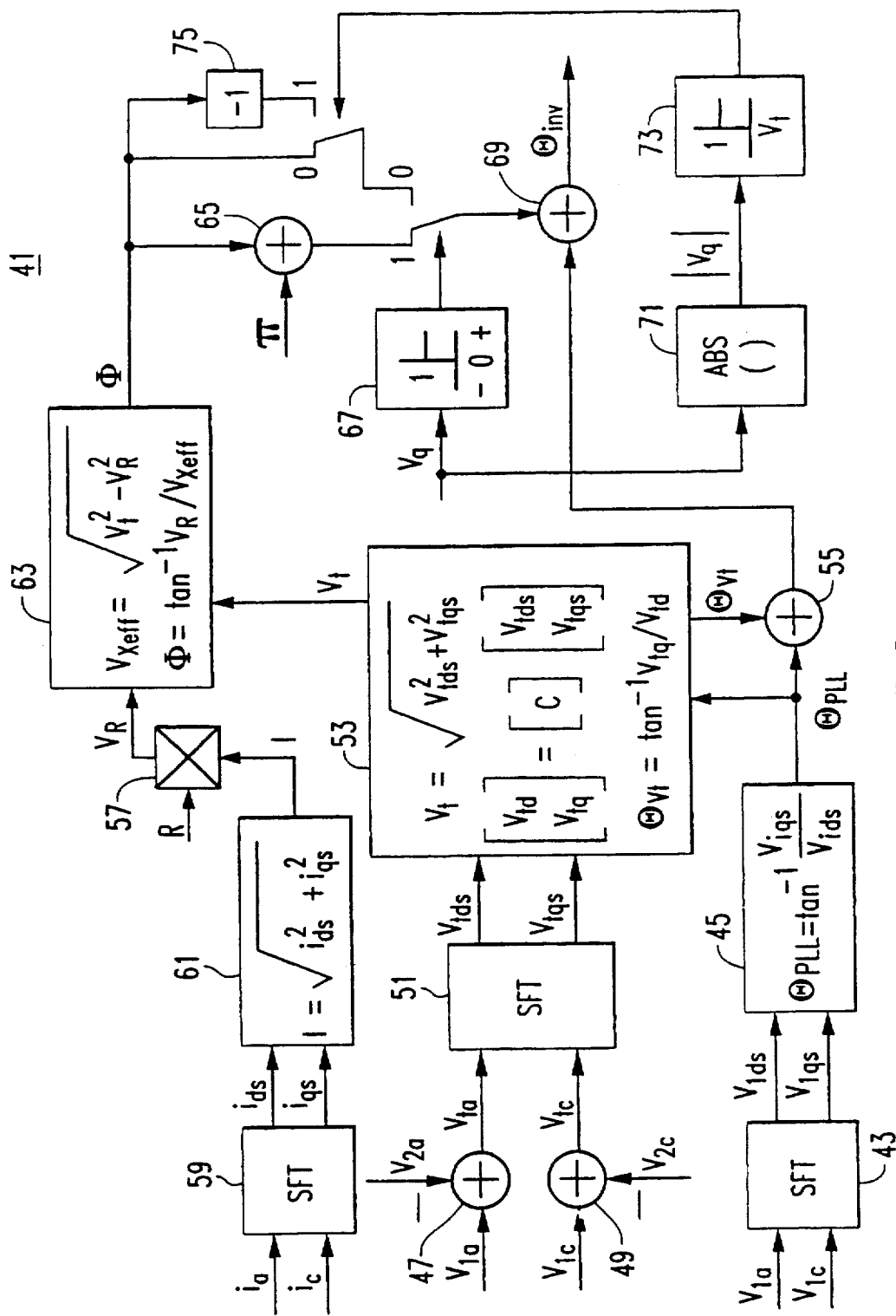

FIG. 8 illustrates the voltage compensation control scheme 41 used by the inverter angle generator 27 to generate the reference angle $\theta_{inv}$. This angle is phase locked to the phase a of the sending end voltage provided by the PT 31. As seen in FIG. 8, a stationary frame transformation (SFT) 43 is applied to the sending end phase a and c voltages $V_{1a}$ and $V_{1c}$, to generate quadrature components which are applied to a phase lock loop 45 to generate a reference angle $\theta_{PLL}$. The phase a and phase c components of the sending and receiving end voltages are subtracted at 47 and 49, respectively, to generate a and c transmission voltages $V_{ta}$ and $V_{tc}$. A stationary frame transformation 51 is used to generate quadrature components of this transmission voltage. These quadrature components are used at 53 together with the reference angle $\theta_{PLL}$ to generate the transmission voltage $V_t$ and the phase angle $\theta_{V_t}$ of the transmission voltage. The phase angle of the transmission line voltage $\theta_{V_t}$ is added to the reference phase angle $\theta_{PLL}$ at 55. The resultant angle is the absolute angle of the transmission line voltage.

As mentioned, the transmission line voltage is a function of the inductive reactance and the resistance of the line and the line current. In order to generate the compensation voltage which is either in phase or 180° out of phase with the reactive component of the transmission line voltage, the magnitude of the real component due to the resistance must be determined so that the angle of the reactive component can be calculated. The voltage $V_R$ due to the resistance component is determined at 57 by multiplying the resistance R of the transmission line by the current I. The current I is determined from the measured phase a and c currents $i_a$ and $i_c$ by applying a SFT at 59 to produce quadrature components of the current which are then used at 61 to calculate the magnitude I of the current. The magnitude of the transmission line voltage $V_t$ and the magnitude of the real component of that voltage $V_R$ are used at 63 to determine the effective reactance component $V_{Xeff}$ of the transmission line voltage and the angle $\phi$ between $V_{Xeff}$ and the transmission line voltage $V_t$.

As mentioned, the compensation voltage can be injected either in phase or 180° out of phase with the reactive component of the transmission line voltage. For instances where the compensation voltage is to be injected 180° out of phase with the reactive component of the transmission line voltage, $\pi$ radians are added to $\phi$ at 65 under such circumstances. Under these circumstances, the set point value for the compensation voltage $V_q$ will be positive as determined at the switch 67 so that the resultant angle, $\phi$ plus $\pi$ generated at 65 is added to the absolute value of the transmission line voltage from 55 in the summing junction 69 to produce the angle $\theta_{inv}$ which is the angle at which the compensation voltage is to be injected into the transmission line. When the compensation voltage is injected at 180° out of phase with the voltage across the transmission line effective reactance, of the line current leads the injected voltage causing the SSSC to operate as an equivalent capacitive reactance. As the set point for the compensating voltage increases, the line current and, therefore, the power flow in the transmission line increases monotonically.

When the compensating voltage is to be injected in phase with the voltage across the transmission line effective reactance, the set point value of $V_q$ is negative so that the switch controlled by 67 is set to the right in FIG. 8. Thus, the angle $\phi$ alone is added to the transmission line voltage angle in 69. Under these conditions, the line current lags the compensation voltage at first, causing the SSSC to operate as an equivalent inductive reactance. As the compensating voltage demand or set point value continues to increase in the same direction, the line current and, therefore, the power flow in the transmission line decrease toward zero. The compensating voltage demand can further be increased in the same direction resulting in a reversal of the power flow in the transmission line. The line current reverses and leads the injected voltage, resulting in the SSSC to appear as an equivalent capacitive reactance. Thus, in the control scheme shown in FIG. 8, the absolute value of the compensation voltage demand $V_q$ is generated at 71. As long as this absolute value of the compensation voltage is less than the magnitude of the transmission line voltage, as determined at 73, $\phi$ is directly added to the transmission line voltage angle in 69. However, when the magnitude of the compensation voltage demand exceeds the magnitude of the transmission line voltage, the sense of $\phi$ is reversed at 75.

As can be seen from the above, use of the proposed voltage compensation control mode of operation of an SSSC results in the power flow, $P_q$ in the transmission line always increasing when the compensating voltage is injected at 180° out of phase with the voltage across the transmission line effective reactance. Also, the power flow $P_q$, decreases, at first, from the uncompensated value when the compensating voltage is injected in phase with the voltage across the transmission line effective reactance. Further increase in the compensating voltage injected in the same direction decreases the power flow, $P_q$, to zero before increasing in the reverse direction. Therefore, the power flow in the transmission line can be reversed with absolute stability.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. Apparatus for controlling power flow in the transmission line carrying an alternating current, said apparatus comprising:

means sensing a first voltage and a second voltage at two spaced apart points on said transmission line;

means determining the transmission line voltage as a difference between said first voltage and said second voltage;

means determining a reactive component of said transmission line voltage; and means injecting a compensating voltage in series into said transmission line which is one of in phase and 180° out of phase with said reactive component of said transmission line voltage, and including means setting a magnitude of said compensating voltage to effect a predetermined change in power flow through said transmission line.

2. The apparatus of claim 1 wherein said means injecting said compensating voltage comprises means injecting said compensating voltage in phase with said reactive component of said transmission line voltage, and said means setting said magnitude of said compensating voltage sets said magnitude to exceed a magnitude of said reactive component of said transmission line voltage without compensation to reverse power flow in said transmission line.

3. The apparatus of claim 2 wherein said means setting said magnitude of said compensating voltage comprises means increasing said magnitude through said magnitude of said reactive component of said transmission line voltage without compensation to effect stable reversal of power flow.

4. The apparatus of claim 3 wherein said means injecting said compensating voltage comprises an inverter having an ac output, means coupling said ac output to said transmission line to inject said compensating voltage in series with said transmission line, and control means controlling said inverter to generate said compensating voltage.

5. Apparatus for controlling power flow in a transmission line carrying an alternating current, said apparatus comprising:

an inverter generating a compensating voltage;

means injecting said compensating voltage in series into said transmission line;

measuring means measuring transmission line parameters including a first voltage and a second voltage at spaced apart points on said transmission line; and control means comprising means determining from said transmission line parameters including said first voltage and said second voltage an effective voltage across effective transmission line reactance between said two points and means generating a control signal for operating said inverter to generate said compensating voltage in phase with or alternatively 180° out of phase with said effective voltage.

6. The apparatus of claim 5 wherein said measuring means further includes means measuring current in said transmission line, and wherein said means determining said effective voltage includes means determining a transmission line voltage as a difference between said first voltage and second voltage, means providing a resistance of said transmission line between said first and second points and means using said current, resistance, and said transmission line voltage to determine said effective voltage.

7. A method for controlling power flow in a transmission line carrying an alternating current, said method comprising the steps of:

measuring voltage at two spaced apart points on said transmission line;

determining a transmission line voltage as the difference between said voltages measured at said two spaced apart points;

determining a reactive component of said transmission line voltage;

generating a compensating voltage at a selected magnitude and one of in phase and 180° out of phase with said reactive component; and injecting said compensating voltage into said transmission line in series.

8. The method of claim 7 wherein said step of generating said compensating voltage comprises generating said compensating voltage in phase with said reactive component of said transmission line voltage and increasing said magnitude of said compensating voltage to a magnitude of said reactive component without said compensating voltage to bring current in said transmission line down to zero and further increasing said magnitude of said compensating voltage to reverse said current in said transmission line.

\* \* \* \* \*

UNITED STATES PATENT AND TRADEMARK OFFICE
CERTIFICATE OF CORRECTION

PATENT NO. :   5,754,035

DATED       :   May 19, 1998

INVENTOR(S) :   KALYAN K. SEN

It is certified that error appears in the above-identified patent and that said Letters Patent is hereby corrected as shown below:

In the drawings, FIGS. 5, 6 AND 8 SHOULD BE DELETED, AND THE ATTACHED FIGS. 5, 6 AND 8 SHOULD BE INSERTED THEREFOR.

Signed and Sealed this

Tenth Day of August, 1999

Attest:

Q. TODD DICKINSON

*Attesting Officer*   Acting Commissioner of Patents and Trademarks